US009574519B2

United States Patent
Lacko

(10) Patent No.: US 9,574,519 B2
(45) Date of Patent: Feb. 21, 2017

(54) MULTI SURFACE BLOCKER DOOR SYSTEM AND APPARATUS

(71) Applicant: ROHR, INC., Chula Vista, CA (US)

(72) Inventor: Anthony Lacko, San Diego, CA (US)

(73) Assignee: ROHR, INC., Chula Vista, CA (US)

(*) Notice: Subject to any disclaimer, the term of this patent is extended or adjusted under 35 U.S.C. 154(b) by 401 days.

(21) Appl. No.: 13/975,038

(22) Filed: Aug. 23, 2013

(65) Prior Publication Data

US 2015/0056070 A1 Feb. 26, 2015

(51) Int. Cl.
| | |
|---|---|
| *F02K 1/70* | (2006.01) |
| *F02K 1/64* | (2006.01) |
| *F02K 1/54* | (2006.01) |
| *F02K 1/76* | (2006.01) |
| *F02K 1/56* | (2006.01) |
| *F02K 1/72* | (2006.01) |
| *F02K 1/58* | (2006.01) |
| *F02K 1/68* | (2006.01) |

(52) U.S. Cl.
CPC . *F02K 1/70* (2013.01); *F02K 1/54* (2013.01); *F02K 1/64* (2013.01); *F02K 1/56* (2013.01); *F02K 1/566* (2013.01); *F02K 1/58* (2013.01); *F02K 1/68* (2013.01); *F02K 1/72* (2013.01); *F02K 1/766* (2013.01)

(58) Field of Classification Search
CPC .............. F02K 1/54; F02K 1/56; F02K 1/566; F02K 1/58; F02K 1/64; F02K 1/68; F02K 1/70; F02K 1/72; F02K 1/766
See application file for complete search history.

(56) References Cited

U.S. PATENT DOCUMENTS

| | | | | |
|---|---|---|---|---|
| 3,262,270 A | * | 7/1966 | Beavers | F02K 1/72 239/265.19 |
| 3,829,020 A | * | 8/1974 | Stearns | F02K 1/09 181/216 |
| 4,005,822 A | * | 2/1977 | Timms | B64C 25/423 239/265.31 |
| 4,073,440 A | * | 2/1978 | Hapke | F02K 1/74 239/265.29 |
| 4,137,711 A | * | 2/1979 | Montgomery | F02K 1/72 239/265.31 |
| 4,894,985 A | * | 1/1990 | Dubois | F02K 1/70 239/265.29 |
| 5,782,431 A | * | 7/1998 | Gal-Or | F02K 1/002 239/265.11 |
| 5,799,903 A | * | 9/1998 | Vauchel | F02K 1/68 239/265.19 |
| 5,853,148 A | * | 12/1998 | Standish | F02K 1/72 239/265.29 |
| 8,720,182 B2 | * | 5/2014 | Jain | F02K 1/11 239/265.19 |

(Continued)

*Primary Examiner* — Gerald L Sung
*Assistant Examiner* — Scott Walthour
(74) *Attorney, Agent, or Firm* — Snell & Wilmer, L.L.P.

(57) ABSTRACT

A multi-surface blocker door system for a thrust reverser of an aircraft is provided. The system may comprise one or more first blocker doors coupled to the inner fixed structure. The first blocker doors may be configured to obstruct a fan duct area adjacent the engine. The system may also comprise one or more second blocker doors coupled to a translating sleeve. The second blocker doors may be configured to obstruct a fan duct area adjacent to an inlet of the nacelle.

20 Claims, 2 Drawing Sheets

(56) References Cited

U.S. PATENT DOCUMENTS

2010/0269485 A1* 10/2010 Jain .................... F02K 1/70
                                                60/204
2011/0127353 A1*  6/2011 Letay ................... F02K 1/68
                                                239/265.37

* cited by examiner

MULTI SURFACE BLOCKER DOOR SYSTEM AND APPARATUS

FIELD

The present disclosure relates to thrust reverser air management, and more particularly, to a multi-blocker door system for inhibiting and/or directing air flow in a fan air duct.

BACKGROUND

Thrust reverser systems are typically employed on aircraft jet engines to provide rearward thrust during landing. These thrust reverser systems may generally comprise a fixed structure and a translating structure. The translating structure may generally comprise a blocker door that may be deployed by a mechanical linkage (e.g., a drag link system) to the fixed structure. The blocker doors rotate into at least a portion of the fan air duct during thrust reverser operation, and in response to the translating sleeve fore-aft motion.

SUMMARY

In various embodiments, a thrust reverser system may comprise a translating sleeve, an inner fixed structure ("IFS"), a first blocker door and a second blocker door. The translating sleeve and the inner fixed structure may define a fan air duct. The first blocker door may be coupled to the inner fixed structure. The second blocker door may be coupled to the translating sleeve.

In various embodiments, an aircraft nacelle may comprise a translating sleeve, an inner fixed structure, a plurality of first blocker doors, and a plurality of second blocker doors. The inner fixed structure may define a fan air duct between the inner fixed structure and the translating sleeve. The plurality of first blocker doors may be coupled to the inner fixed structure. The plurality of second blocker doors may be coupled to the translating sleeve.

In various embodiments, a multi surface blocker door system may comprise a first blocker door and a second blocker door. The first blocker door may be rotatably coupled to an inner fixed surface. The first blocker door may also be operatively coupled to a first drive mechanism. The first drive mechanism may also be configured to deploy the first blocker door. The second blocker door may be rotatably coupled to a translating sleeve. The second blocker door may be operatively coupled to a second drive mechanism. The second drive mechanism may also be configured to deploy the second blocker door.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference, to without contact (or similar phrases) may also include reduced contact or minimal contact.

As used herein, "aft" refers to the direction associated with the tail (e.g., the back end) of an aircraft, or generally, to the direction of exhaust of the engine. As used herein, "forward" refers to the directed associated with the nose (e.g., the front end) of an aircraft, or generally, to the direction of flight.

Typical thrust reverser systems may comprise drag link systems to deploy one or more blocker doors in response to the thrust reverser system being activated (e.g., a translating sleeve being moved aft). These draft link systems often include mounting hardware (e.g., brackets) that may be mounted in an engine fan air duct. The drag link and associated mounting hardware may affect the aerodynamic performance of the fan air duct, and/or may increase noise from the fan air duct. Moreover, as engine fan diameters increase, traditional drag link components may reach their kinematic and/or geometric limits, making traditional systems infeasible.

In various embodiments, the diameter of an engine fan and an associated nacelle may be increased in order to improve fan and overall engine performance. With this increase in size, thrust reverser systems may be adapted to manage increased fan airflow used to create reverse thrust. In various embodiments, a thrust reverser system comprising blocker doors that are located on both the translating sleeve and inner fixed structure may provide a solution for applications where the fan duct diameters are large.

Figure 1:
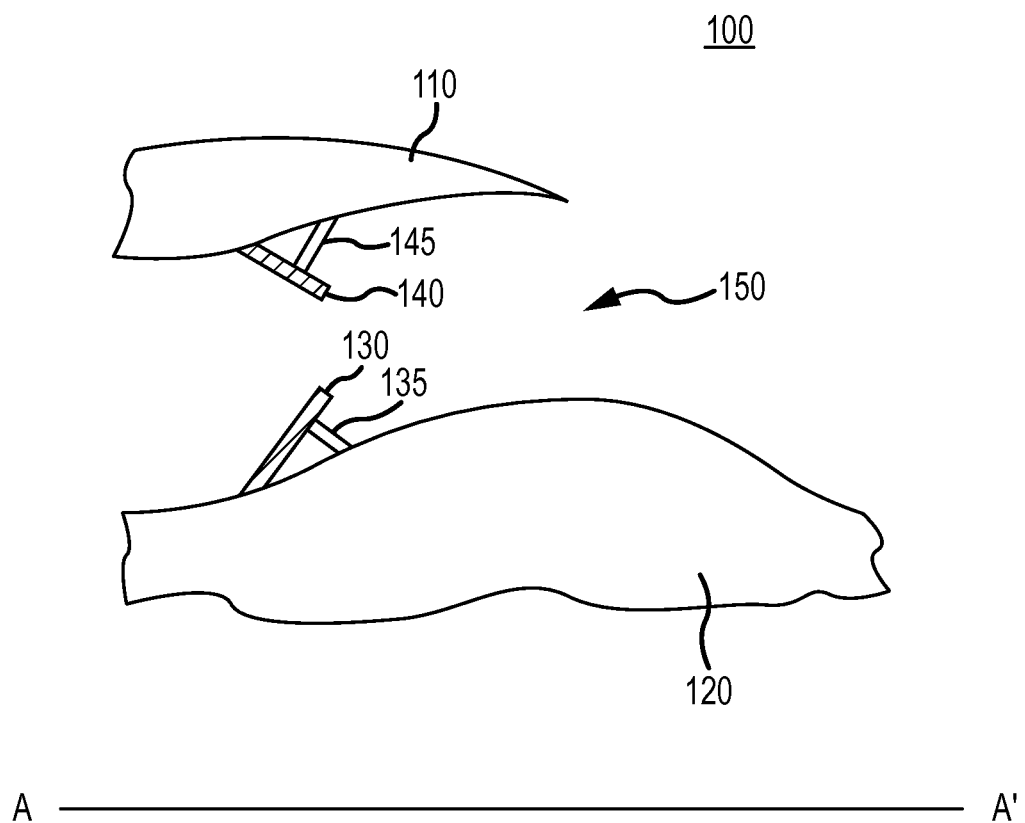
FIG. 1 illustrates a cross-sectional view of a portion of a thrust reverser system in an at least partially deployed configuration, in accordance with various embodiments.

In various embodiments and with reference to FIG. 1, a portion of a nacelle 100 showing components of a thrust reverser system is provided. Nacelle 100 may comprise a translating sleeve 110 and an inner fixed structure 120. Translating sleeve 110 and IFS 120 may generally define a flow channel and/or a portion of the fan air duct 150.

In various embodiments, IFS 120 may further comprise and/or be configured with one or more first blocker doors 130. First blocker doors 130 may be rotatably coupled to or deployable from IFS 120. Translating sleeve 110 may comprise and/or be configured with one or more second blocker doors 140. Second blocker doors 140 may be rotatably coupled to and/or deployable from translating sleeve 110. In response to the thrust reverser system being activated (e.g., during a landing event, and or in response to translating sleeve 110 being moved aft), first blocker door 130 and second blocker door 140 may rotate into a fan air duct 150. In this regard, first blocker door 130 may rotate away from the centerline A-A' (e.g., the centerline of the engine and/or nacelle) to deploy. Second blocker door 140 may rotate towards centerline A-A' to deploy. First blocker door 130 and second blocker door 140 may at least partially obscure, inhibit, and/or divert airflow through fan air duct 150.

In various embodiments, first blocker door 130 may be driven by any suitable drive mechanism 135. For example, drive mechanism 135 may be a linkless actuation system, a linear actuator and/or any other suitable mechanism configured to drive first blocker door 130. Similarly, second blocker door 140 may be driven into the area of fan air duct 150 by a drive mechanism 145. Drive mechanism 145 may be any suitable drive mechanism including, for example, a link-less actuation system, a gear mechanism, a rack and pinion mechanism, a linear actuator and/or the like. Drive mechanism 135 may be installed forward and/or aft of first blocker door 130. Similarly, drive mechanism 145 may be installed forward and/or aft of first blocker door 140.

In various embodiments, first blocker door 130 and/or second blocker door 140 may be shorter (e.g., the radial length relative to axis A-A') than traditional blocker doors and/or may be shorter relative to a blocker door that would be required in a large engine fan application. In this regard, the actuation stroke to translate first blocker door 130 and/or second blocker door 140 may be shorter than would be necessary for a traditional single surface (e.g., translating sleeve mounted, drag link deployed) blocker door system. This shorter stroke may allow for and/or facilitate inclusion of link-less and/or hidden link deployment mechanisms. The link-less and/or hidden link mechanisms may be located underneath and/or behind first blocker door 130 and/or second blocker door 140. In this regard, typical drag link structures could be eliminated from fan air duct 150, providing a fan air duct 150 that may be quieter and/or more aerodynamically efficient than traditional fan air ducts with traditional blocker door thrust reverser systems.

Figure 2:
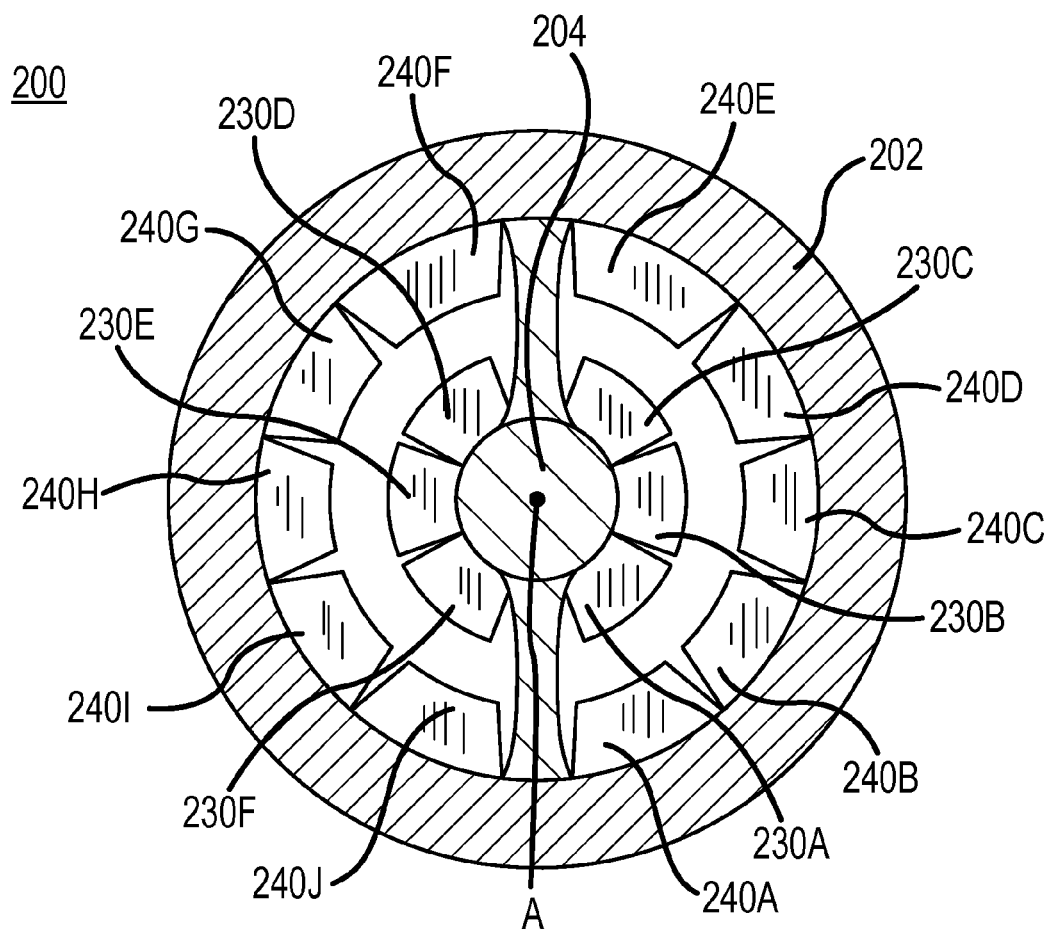
FIG. 2 illustrates a front view of an aircraft engine with the thrust reverser system in an at least partially deployed configuration, in accordance with various embodiments.

In various embodiments and with reference to FIG. 2, a forward portion 202 of a nacelle 200 with an engine core 204, is shown, and includes a thrust reverser in the deployed configuration. The fan is not shown to illustrate first blocker doors 230 and second blocker doors 240. Forward portion 202 of nacelle 200 shows a plurality of first blocker doors 230 (shown as first blocker doors 230A, 230B, 230C, 230D, 230E, and 230F) and a plurality of second blocker doors 240 (shown as first blocker doors 240A, 240B, 240C, 240D, 240E, 240F, 240G, 240H, 240I, and 240J) in a deployed configuration (e.g., thrust reverser active configuration). First blocker doors 230 may be generally located on the IFS and adjacent to and/or concentrically around the center A of engine 204. In this regard, first blocker doors 230 may obstruct a portion of the area of the fan duct that is adjacent to the IFS. A plurality of second blocker doors 240A-240J may be coupled to the translating sleeve adjacent to the inner diameter of forward portion 202. In this regard, second blocker doors 240 may obstruct a portion of the area of the fan duct that is adjacent to forward portion 202.

In various embodiments, nacelle 200 and/or the associated thrust reverser system may comprise any suitable number of first blocker doors 230 and/or second blocker doors 240. Moreover, first blocker doors 230 may be any suitable shape, size, profile, and/or the like. Similarly, second blocker doors 240 may be any suitable shape, size, profile, and/or the like.

In various embodiments, first blocker doors 230 and second blocker doors 240 may obstruct and/or inhibit air flow through the fan air duct. In this regard, first blocker doors 230 and second blocker doors 240 may be installed in an arrangement about the IFS and the translating sleeve such that a portion of the cross-sectional area of the fan duct is not obstructed. Moreover, the unobstructed area may be designed into the fan air duct to provide an area match. In this regard, first blocker door 230 and second blocker door 240 may be configured with an unobstructed cross-sectional area that provides an area match to the engine mass flow requirements for stable operation.

In various embodiments, the multi-surface blocker door systems and apparatuses described herein may be employed with any suitable nacelle, engine, and/or thrust reverser system.

Thus, in various embodiments, the multi-surface blocker door systems and apparatuses described herein may improve the aerodynamic performance of an engine with large diameter fans, improve the aerodynamic efficiency of a fan air duct, and minimize noise created in the nacelle during operation.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims in which reference to an element in the singular is not intended to mean "one and only one" unless explicitly so stated, but rather "one or more."

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

What is claimed is:

1. A multi-surface blocker door system, comprising:
   a first blocker door rotatably coupled to an inner fixed surface about a forward end of the first blocker door, wherein the first blocker door is configured to rotate about the forward end of the first blocker door such that an aft end of the first blocker door rotates radially outward, with respect to a longitudinal axis of the inner fixed surface, and wherein, when deployed, the first blocker door is configured to block a first portion of bypass air in a fan air duct, the first blocker door operatively coupled to a first drive mechanism, wherein the first drive mechanism is configured to deploy the first blocker door, wherein the first blocker door is located forward of an aft end of a translating sleeve; and a second blocker door rotatably coupled to the translating sleeve about a forward end of the second blocker door, wherein the second blocker door is configured to rotate about the forward end of the second blocker door such that an aft end of the second blocker door rotates radially inward, with respect to the longitudinal axis of the inner fixed surface, and wherein, when deployed, the second blocker door is configured to block a second portion of bypass air in the fan air duct, the second blocker door operatively coupled to a second drive mechanism, wherein the second drive mechanism is configured to deploy the second blocker door;

wherein when the first blocker door and the second blocker door are deployed, a portion of the fan air duct defined radially, with respect to the longitudinal axis of the inner fixed surface, between the aft end of the first blocker door and the aft end of the second blocker door is unobstructed by the first blocker door and the second blocker door.

2. The multi-surface blocker door system of claim 1, wherein the first blocker door is configured to obstruct a fan duct area adjacent an engine installed within a nacelle, and wherein the fan duct area is defined by the inner fixed surface and the translating sleeve.

3. The multi-surface blocker door system of claim 1, wherein the second blocker door is configured to obstruct a fan duct area adjacent to an outer diameter of a nacelle.

4. The multi-surface blocker door system claim 1, wherein the first blocker door is one of a plurality of first blocker doors.

5. The multi-surface blocker door system claim 1, wherein the second blocker door is one of a plurality of second blocker doors.

6. The multi-surface blocker door system claim 1, wherein the first drive mechanism is at least one of a first link-less deployment mechanism and a first linear actuator and wherein the second drive mechanism is at least one of a second link-less deployment mechanism and a second linear actuator.

7. A thrust reverser system, comprising:
a translating sleeve;
an inner fixed structure, wherein the translating sleeve and the inner fixed structure define a fan air duct;
a first blocker door located within the fan air duct, wherein a forward end of the first blocker door is rotatably coupled to the inner fixed structure, wherein the first blocker door is configured to rotate about the forward end of the first blocker door such that an aft end of the first blocker door rotates radially outward, with respect to a longitudinal axis of the inner fixed structure, and wherein, when deployed, the first blocker door is configured to block a first portion of bypass air in the fan air duct; and
a second blocker door located within the fan air duct, wherein a forward end of the second blocker door is rotatably coupled to the translating sleeve, wherein the second blocker door is configured to rotate about the forward end of the second blocker door such that an aft end of the second blocker door rotates radially inward, with respect to the longitudinal axis of the inner fixed structure, and wherein, when deployed, the second blocker door is configured to block a second portion of bypass air in the fan air duct;

wherein when the first blocker door and the second blocker door are deployed, a portion of the fan air duct defined radially, with respect to the longitudinal axis of the inner fixed structure, between the aft end of the first blocker door and the aft end of the second blocker door is unobstructed by the first blocker door and the second blocker door.

8. The thrust reverser system of claim 7, wherein a drive mechanism is located radially inward of the first blocker door and is configured to deploy the first blocker door.

9. The thrust reverser system of claim 7, wherein a drive mechanism is located radially outward of the second blocker door and is configured to deploy the second blocker door.

10. The thrust reverser system of claim 7, wherein the inner fixed structure is coupled to a plurality of first blocker doors.

11. The thrust reverser system of claim 10, wherein the translating sleeve is coupled to a plurality of second blocker doors.

12. The thrust reverser system of claim 7, wherein the first blocker door is configured to obstruct an area adjacent to the inner fixed structure.

13. The thrust reverser system of claim 12, wherein the second blocker door is configured to obstruct an area adjacent to the translating sleeve.

14. The thrust reverser system of claim 7, wherein the thrust reverser system is operatively installed in an aircraft nacelle.

15. The thrust reverser system of claim 7, wherein the first blocker door and the second blocker door are configured to define a flow area for area match to an engine mass flow requirement for the thrust reverser system.

16. An aircraft nacelle, comprising:
a translating sleeve;
an inner fixed structure defining a fan air duct between the inner fixed structure and the translating sleeve;
a plurality of first blocker doors located within the fan air duct, wherein a forward end of each first blocker door of the plurality of first blocker doors is rotatably coupled to the inner fixed structure, wherein each first blocker door of the plurality of first blocker doors is configured to rotate about the forward end of each first blocker door of the plurality of first blocker doors such that an aft end of each first blocker door rotates radially outward, with respect to a longitudinal axis of the inner fixed structure, and wherein, when deployed, the plurality of first blocker doors are configured to block a first portion of bypass air in the fan air duct; and
a plurality of second blocker doors located within the fan air duct and rotatably coupled to the translating sleeve about a forward end of each second blocker door of the plurality of second blocker doors such that an aft end of each second blocker door rotates radially inward, with respect to the longitudinal axis of the inner fixed structure, and wherein, when deployed, the plurality of second blocker doors are configured to block a second portion of bypass air in the fan air duct;
wherein when the plurality of first blocker doors and the plurality of second blocker doors are deployed, a portion of the fan air duct defined radially, with respect to the longitudinal axis of the inner fixed structure, between the aft ends of the plurality of first blocker doors and the aft ends of the plurality of second blocker doors is unobstructed by the plurality of first blocker doors and the plurality of second blocker doors.

17. The aircraft nacelle of claim 16, further comprising an engine.

18. The aircraft nacelle of claim 17, wherein the plurality of first blocker doors are configured to obstruct an area of the fan air duct adjacent to the engine.

19. The aircraft nacelle of claim 16, further comprising a drive mechanism installed radially outward of the plurality of second blocker doors.

20. The aircraft nacelle of claim 16, further comprising a drive mechanism installed radially inward of the plurality of first blocker doors.

\* \* \* \* \*